July 31, 1962 R. A. KAMPMEYER 3,047,655

BLACK LEVEL STABILIZING CIRCUIT FOR TELEVISION SYSTEMS

Filed March 16, 1959 2 Sheets-Sheet 1

INVENTOR

ROY ALLEN KAMPMEYER

BY K. G. Doub

ATTORNEY

July 31, 1962 R. A. KAMPMEYER 3,047,655

BLACK LEVEL STABILIZING CIRCUIT FOR TELEVISION SYSTEMS

Filed March 16, 1959 2 Sheets-Sheet 2

INVENTOR

ROY ALLEN KAMPMEYER

BY K. G. Doub

ATTORNEY

United States Patent Office 3,047,655

Patented July 31, 1962

3,047,655

BLACK LEVEL STABILIZING CIRCUIT FOR TELEVISION SYSTEMS

Roy Allen Kampmeyer, Baltimore County, Md., assignor to The Bendix Corporation, a corporation of Delaware Filed Mar. 16, 1959, Ser. No. 799,538
1 Claim. (Cl. 178—7.1)

In television systems designed to operate at extremely low light levels, such as high resolution, high sensitivity closed-circuit systems, even minor variations in the background spectrum or "black level" of the picture will render much-needed detail obscure. As is well known by those having a layman's knowledge of television circuitry, the picture background is made up of the D.C. component of the video waveform, and this component is lost when the video signals from the pickup tube pass through the coupling capacitors of the video amplifiers and must be restored for the kinescope display. D.C. reinsertion circuits usually include a keyed clamp which if functioning properly should hold the D.C. level at a preset value during the interval when the target of the pickup tube is blanked for retrace and also insure that each succeeding horizontal line of video will start at exactly the same voltage point or black level value. However, it has been found by experiment with prior known systems, such as exemplified in FIG. 4, which shows a conventional blanking and D.C. reinsertion circuit for closed-circuit television systems, that a certain amount of noise and high frequency video signals, resulting primarily from pickup tube operation, appear at the clamping circuit during retrace and cause random clamping. This is exemplified in FIGS. 4A and 4B. The dashed line in FIG. 4A indicates the desired reference voltage level to be maintained for picture background at the kinescope display. The coupling capacitor C–1 is charged to a selected reference voltage during the clamping interval, and during the ensuing period until the clamp is again applied, the reference voltage remains relatively constant except for a small charge leakage from C–1 into the high resistance of the key clamp circuit. This leakage is usually small enough to be insignificant if the circuit has been properly designed. However, a keyed clamping circuit should not only function to reinsert the D.C. component in the video signals; it should also insure that each succeeding horizontal line of video will start at exactly the same voltage point. Any variation in the D.C. clamping level at the instant the clamp is removed will displace the start of the following video line by the amount ΔE, note FIG. 4B.

It has been found with prior-known systems that noise appearing on the key clamp circuit is not always removed by normal key-clamping action, especially noise in progress at exactly the time of clamp renewal. Keyed clamp problems are discussed in "Fundamentals of T.V. Engineering" by Glasford, 1955 Edition, pages 328–333. Any variation in the D.C. level at which a horizontal line of video starts may be considered as a variation in black level reference, since the keyed clamp is a source of bias for the blanking amplifier, and obviously variations in the bias will cause variations in the blanking output amplitude and thus the degree of "setup" varies. By "setup" is meant the relationship between the black reference level and the maximum amplitude of the blanking pulse. Under these circumstances, when observed from the kinescope, the line whose black level has changed by the amount of ΔE will exhibit a tonal change, thereby affecting the resolution of the object being televised. In low light levels where strong "blacks" and "whites" are not prevalent, small changes in "greys" not in the original scene become serious and it is important that they be removed.

The primary object of the present invention, therefore, is to provide a method and means for substantially cancelling high-frequency noise and unwanted video signals or components from the input to the circuit which provides the D.C. reference level for the system so that the black level reference voltage will remain at a selected D.C. value and each horizontal line of video will start at the same voltage point or value.

Another object is to provide a relatively simple circuit for carrying out the above primary object which does not employ complicated filtering networks and the like which might affect the overall bandpass of the system.

In carrying out the foregoing objects, a highly effective type of noise-cancellation circuit is inserted in the video channel at a suitable point, for example, between the input to the blanking insertion amplifier and the output of the preceding stage of video amplification. This cancellation circuit has two legs branching off from its video input side and terminating in a common adjustable summing point or bucking impedance at its output. One of said legs incorporates an isolation stage such as a cathode follower which is in a continuous state of conduction to pass video signals to the summing point and the other leg incorporates a keyed inverter which is gated on only during the blanking period. The amplified video signals are simultaneously impressed on both the cathode follower and keyed inverter, but since the latter is gated on only during the blanking period, any noise or high-frequency video pulses will pass through both legs to the summing point during this period, but the noise of one leg will be inverted in polarity with respect to the same noise in the other leg, resulting in cancellation of all noise pulses which would appear on the black level reference. The gating pulses are automatically cancelled out of the inverter circuit before reaching the summing point.

A more detailed description of the cancellation circuitry will uncover other objects and advantages of the invention.

While my improved "black level" stabilizing circuit has been particularly designed for, and is shown in conjunction with, a closed-circuit television system, it could also be adapted for open-circuit (carrier wave signal transmission) systems subject to certain modifications obvious to those skilled in the art.

Figure 1:
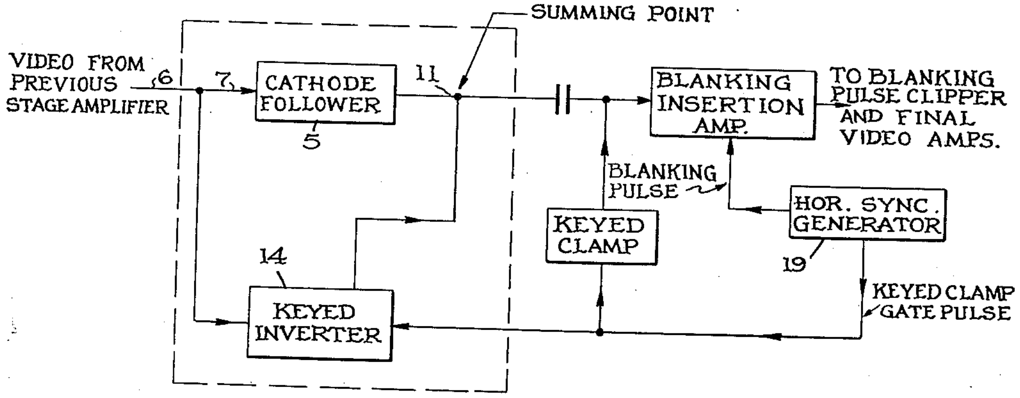
FIG. 1 is a block diagram of a noise cancellation circuit in accordance with the invention shown associated with coacting circuitry in a television system of the closed-circuit type.
Figure 2:
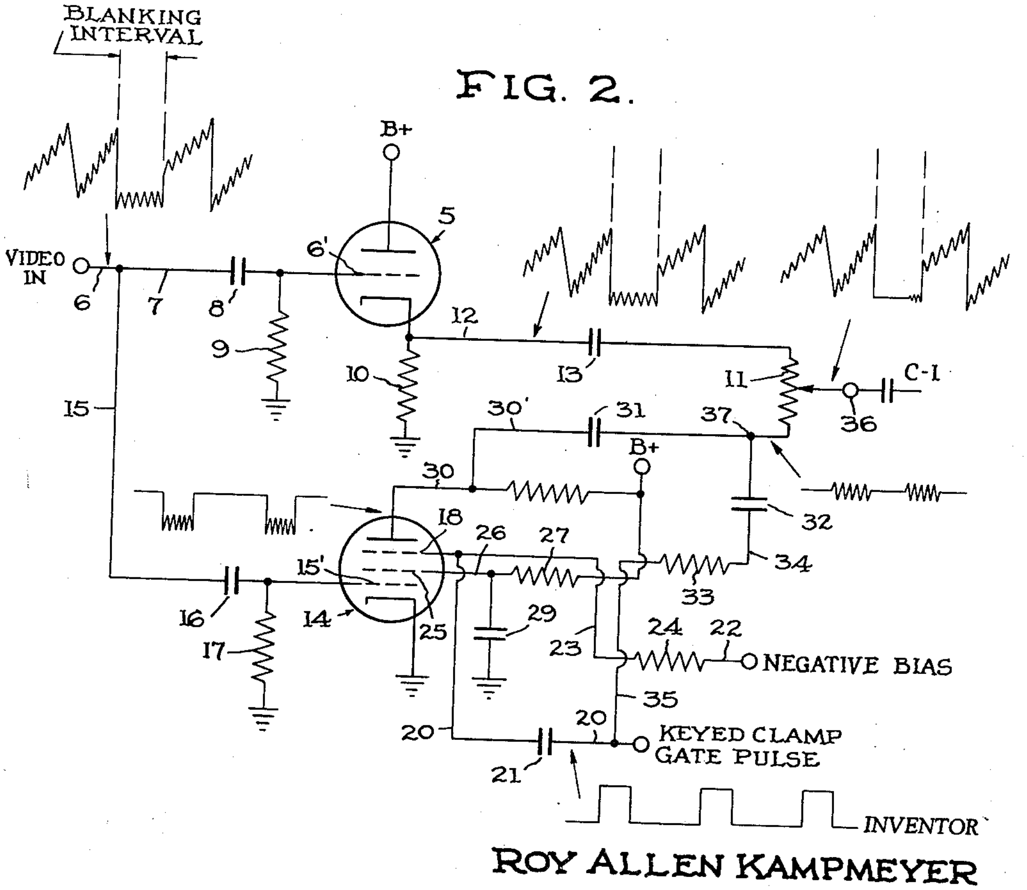
FIG. 2 is an electrical diagram of a preferred form of circuitry for carrying out the objects of the invention.

Referring to FIGS. 1 and 2, an electron discharge device connected in circuit as a cathode follower is indicated at 5; it is illustrated as being a triode having its grid 6′ coupled to video input conductor 6 by conductor 7 and capacitor 8. Resistor 9 is of a value such as to provide self-bias for the grid 6′ (Class A operation), and 10 is the conventional load resistor. The cathode or output circuit is connected to a summing or bucking impedance, shown in the form of a resistance 11, by way of conductor 12 and coupling capacitor 13.

A keyed inverter is indicated at 14; it consists of a dual-control, sharp cut-off pentode having video input grid 15′ coupled to the line 6 by way of conductor 15, capacitor 16 and grid leak resistor 17. Capacitor 16 and resistor 17 provide a high pass filter differentiating network which functions to eliminate the pickup tube blanking signal from the waveform received at the common input lead 6 prior to being impressed on the grid 15′. Suppressor grid 18, which here serves as the control grid, is connected to a suitable gating source, such as the horizontal sync generator 19 shown in block diagram in FIG. 1, by way of conductor 20 and coupling capacitor 21. As illustrated in FIG. 2, the width of the gate pulse corresponds to the width of the clamping interval. However, as will hereinafter appear, the pulse width may be selected to cover any range of noise cancellation lying within the blanking interval. Grid 18 is connected to a source of negative bias by way of conductors 22 and 23 across isolation current-limiting resistor 24. Screen grid 25 is connected to a source of potential, such as the B-plus side of the line, by way of conductor 26 across dropping resistor 27. Capacitor 29 is the usual by-pass for the screen grid.

The discharge anode or plate of inverter 14 is connected to the summing point impedance 11 by way of conductors 30 and 30′ across coupling capacitor 31. The keyed clamp gate pulses also appear in the plate circuit of the inverter 14, and since these pulses are not wanted at the summing point, they must be cancelled out. This is done by a feedback network made up of capacitor 32 and resistor 33 arranged in series in conductor 34, which is connected to the gating pulse input line by way of conductor 35. To ensure stability of the gate pulse cancellation circuit, the suppressor grid bias should be accurately regulated as by use of a Zener diode or the like.

The potentiometer shown diagrammatically at 36 is for adjusting the resistance 11 to compensate for small changes in gain of the tubes or electron discharge devices 5 and 14, which changes would otherwise vary the degree of noise cancellation.

*Operation*

Figures 3, 4, 4A, 4B:
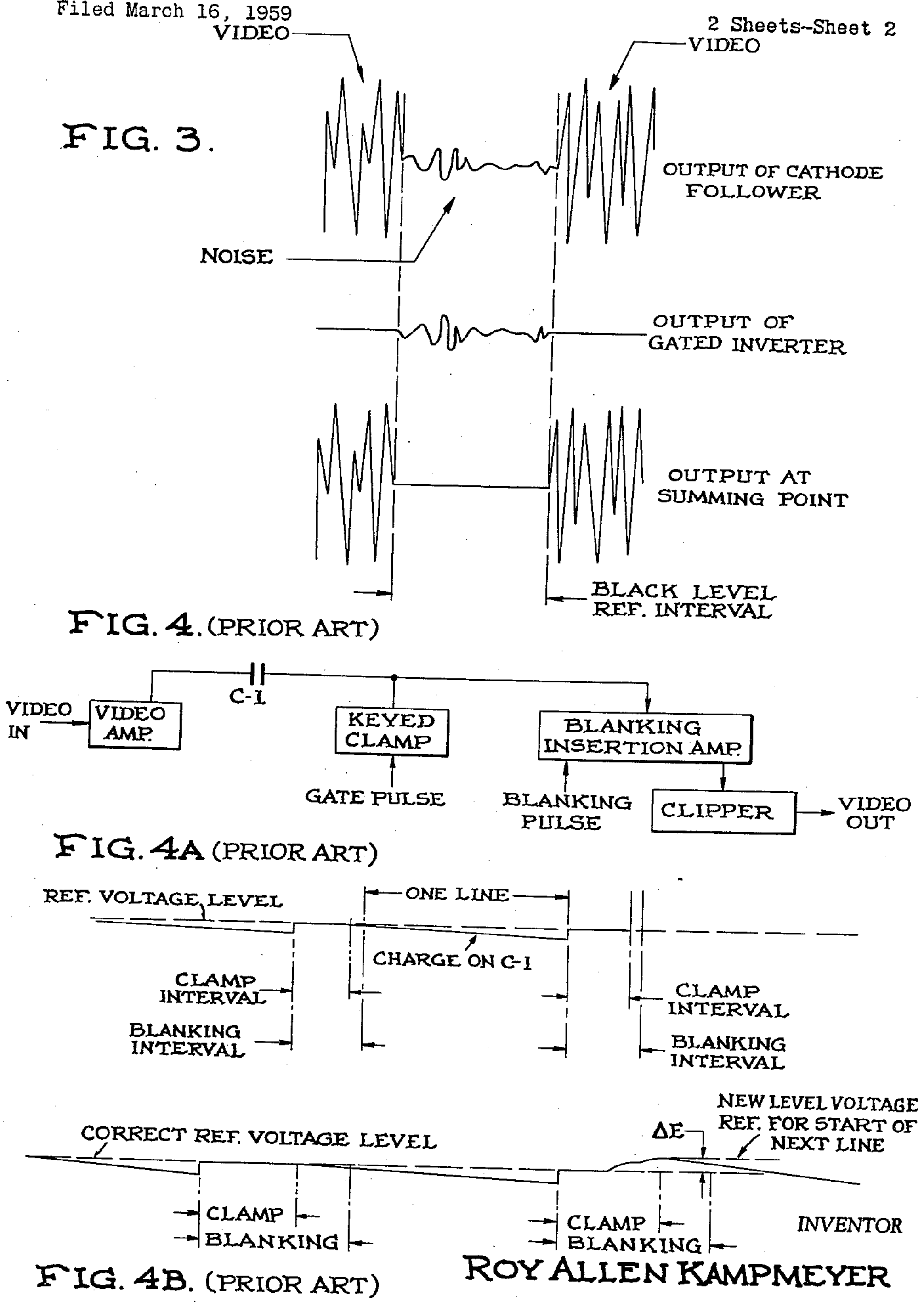
FIG. 3. FIG. 4. (PRIOR ART) FIG. 4A (PRIOR ART) FIG. 4B. (PRIOR ART)
FIG. 3 illustrates the waveform which occurs during a blanking interval and the waveform which results from noise cancellation.
FIG. 4 is a block diagram of a prior art type of blanking and D.C. reinsertion circuit.
FIGS. 4A and 4B are schematic diagrams illustrating the operation of FIG. 4.

Video signals will be passed by the cathode follower 5 without distortion, note examples of waveform taken off of conductors 6 and 12, representing two lines of video and one retrace or blanking interval during which the keyed clamp establishes the black level reference voltage level. However, noise and high frequency video signals have been passed by the cathode follower as examplified by the irregular or jagged line connecting the two lines of video and unless cancelled out, such noise would adversely modulate the D.C. or black level reference level by setting up random keyed clamping and resultant variations in the voltage reference level for the start of the next or succeeding line, as heretofore described in connection with FIG. 4A. However, during the horizontal blanking period, the normally "off" keyed inverter is caused to conduct by a gate pulse, and since the noise signals are also impressed on the grid 15′ of the said inverter, the latter will conduct and any noise appearing on the D.C. reference level will be passed to the summing point 11 in opposed polarity or bucking relation to the same noise passed by the cathode follower 5, thereby producing an output at the summing point such as illustrated at the bottom of FIG. 3. Thus any noise attempting to pass to the blanking insertion amplifier is effectively cancelled.

Since the gating pulses are also passed by the keyed inverter 14 along with the noise pulses, the gating pulses should be cancelled out before reaching the summing point or bucking impedance 11. This is accomplished by the feedback network consisting of conductors 35, 34 and resistor 33 and capacitor 32 arranged in series. The gating pulses are introduced into this circuit by way of conductor 35. The values of the resistance 33 and capacitors 32 and 31 should be such that the gating pulses meeting at point 37 are substantially equal, causing cancellation out at this point. The input amplitude of the keyed clamp pulse may be adjusted in any conventional manner, such as by varying the output of the horizontal sync generator. Obviously, once the desired amplitude is obtained, it should be held constant.

Thus any noise appearing at the summing point 11 during the keyed clamped interval is cancelled out by the same noise passed by the inverter 5. The resulting signal is thus properly formed for application to the keyed clamped circuit shown in block diagram in FIG. 1.

In the operation of the prior art circuit of FIG. 4 (refer to FIG. 4A), it is assumed that the noise appeared on the keyed clamp well within the clamping interval and has continued on through to the end of the clamping interval, or to the time the pulse has cut the inverter "off." There may be times, however, when the noise would not appear on the keyed clamp until just at the end of the clamping interval, in which case the width of the pulse shown at the bottom of FIG. 2 may not prove adequate. Hence to insure cancellation of noise appearing on the keyed clamp at any time during the clamping interval, the width of the gating pulse should be slightly wider than the clamping interval.

In practice, the herein disclosed stabilizing circuit not only effects cancellation of noise from the D.C. black level reference voltage during the clamping interval, but there are also no unwanted variations in the succeeding video period or line, the reference level remaining constant.

What is claimed is:

In a television system including a kinescope, linear scanning means provided with synchronizing pulses, means for blanking the kinescope output during retrace intervals, a video signal channel, a coupling impedance in said channel through which video signals are applied to said kinescope, and keyed clamping means connected to said channel following said coupling impedance for restoring a direct current component to the video signals thereon, said clamping means being rendered periodically conductive by synchronizing pulses derived from said scanning means;

a circuit for stabilizing the black level of said kinescope during blanking intervals comprising a first signal path forming part of said channel for conducting video signals, a summing point connected in said path ahead of said coupling impedance, a normally non-conductive phase inverting amplifier having its input connected to said first signal path ahead of said coupling impedance and supplying its output to said summing point, and means rendering said amplifier conductive in synchronism with said clamping means by the application of pulses derived from said scanning means, whereby during blanking of said signal the retrace noise appearing on said first signal path and appearing at said summing point is cancelled by noise of opposite phase appearing at said summing point from said amplifier.

References Cited in the file of this patent

UNITED STATES PATENTS

| | | |
|---|---|---|
| 2,315,388 | Bedford | Mar. 30, 1943 |
| 2,636,080 | Doba | Apr. 21, 1953 |
| 2,841,646 | Thomas | July 1, 1958 |
| 2,843,662 | Rieke | July 15, 1958 |
| 2,855,458 | Rogers | Oct. 7, 1958 |
| 2,907,822 | Davies | Oct. 6, 1959 |